June 29, 1948.　　　F. C. KNIGHT ET AL　　　2,444,262
APPARATUS FOR FORMING WELDING TAPES
Filed Aug. 12, 1944　　　　　　　　　　　　4 Sheets-Sheet 2

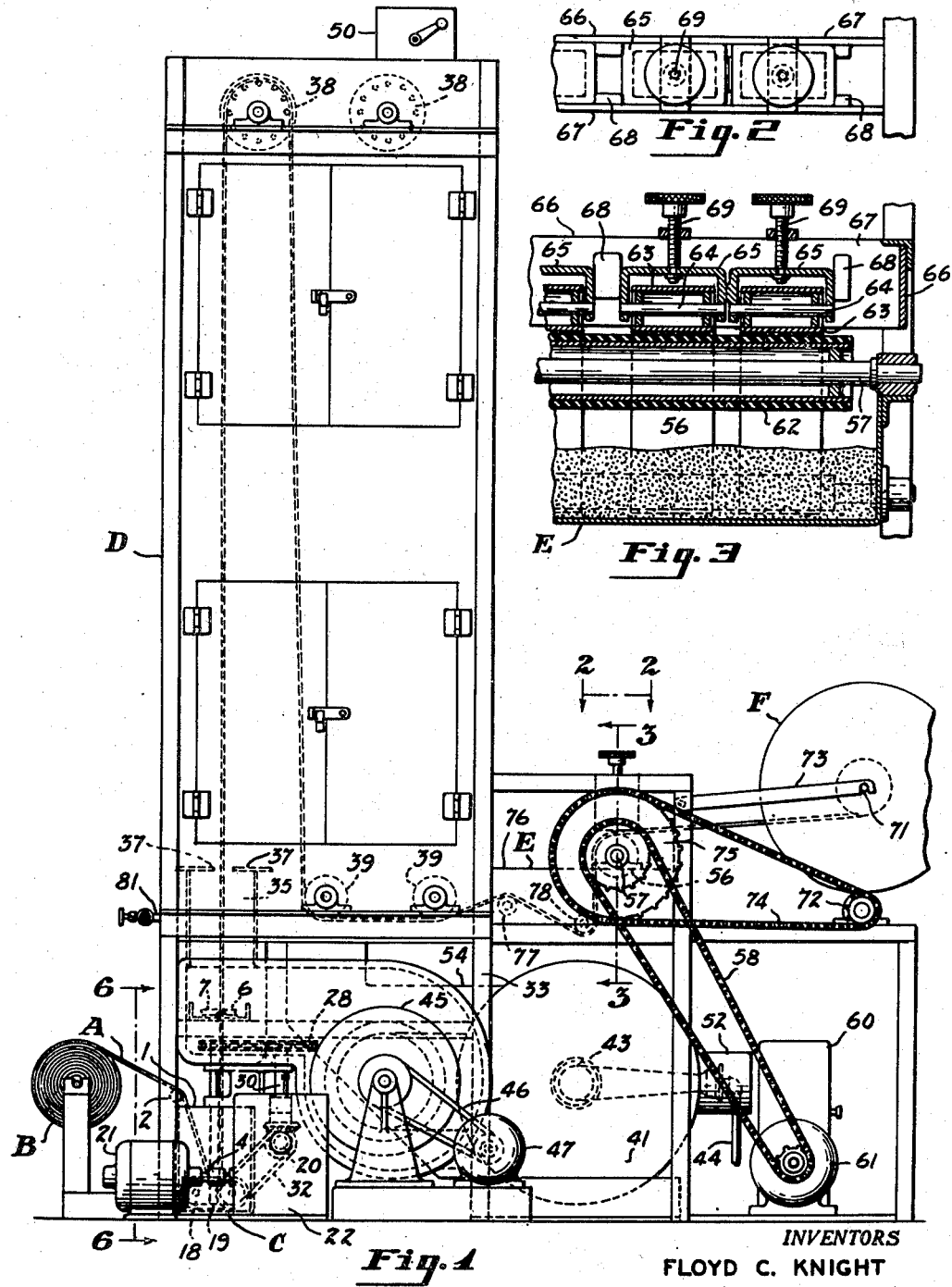

INVENTORS
FLOYD C. KNIGHT
JOHN R. PIERCE
BY
ATTORNEYS

June 29, 1948.  F. C. KNIGHT ET AL  2,444,262
APPARATUS FOR FORMING WELDING TAPES
Filed Aug. 12, 1944  4 Sheets-Sheet 3

INVENTORS
FLOYD C. KNIGHT
JOHN R. PIERCE
BY Evans & McCoy
ATTORNEYS

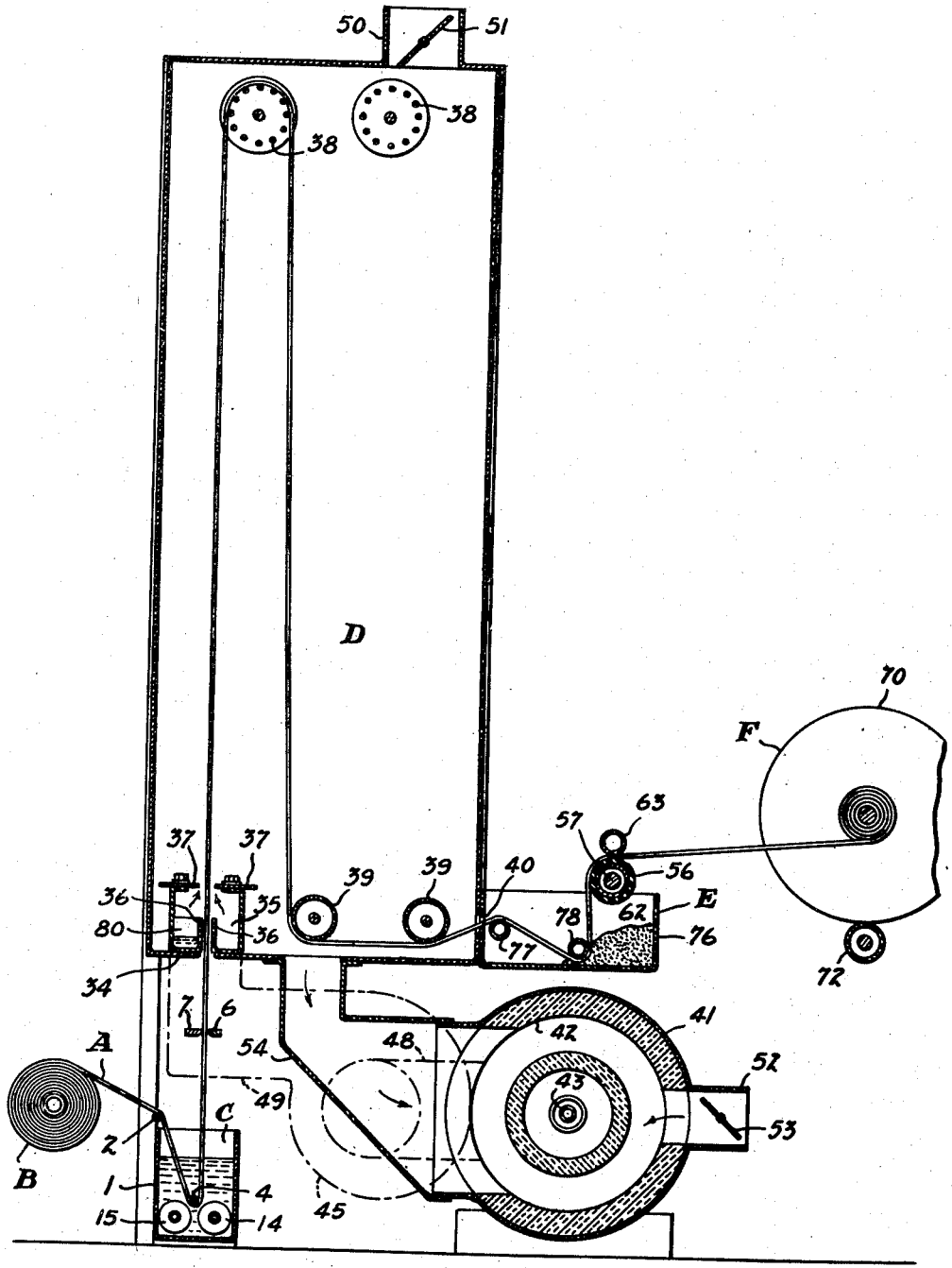

Patented June 29, 1948

2,444,262

UNITED STATES PATENT OFFICE 2,444,262

APPARATUS FOR FORMING WELDING TAPE

Floyd C. Knight, East Cleveland, and John R. Pierce, Cleveland, Ohio, assignors, by mesne assignments, to Arcrods Corporation, a corporation of Delaware Application August 12, 1944, Serial No. 549,224

8 Claims. (Cl. 91—18)

This invention relates to apparatus for forming welding tape and more particularly to a deformable welding tape of the kind disclosed in the patent to Bereit 2,164,104, June 27, 1939, in which the base fabric is composed at least in part of a deformable but inelastic wire, and in which the base fabric is embedded within a body composed of fluxing or slag producing materials.

In the device of the present invention, fluxing or slag producing materials are applied to the fabric in the form of a semi-fluid mud-like mixture, which after application to the fabric strip is dried thereon to form a tape that is adapted to envelope an electrode rod as it is being fed to the welding arc.

The present invention has for its object to provide apparatus for rapidly and continuously applying the semi-fluid body forming mixture to the fabric base, drying the same and winding the finished tape on suitable reels.

It is also an object of the invention to provide means for maintaining the mud bath at a uniform consistency during the passage of the tape through the bath, so as to apply a uniform homogeneous and relatively thick coating to the fabric strips.

With the above and other objects in view, the invention may be said to comprise the apparatus illustrated in the accompanying drawings, hereinafter described and particularly set forth in the appended claims, together with such variations and modifications thereof as may be apparent to one skilled in the art to which the invention pertains.

Reference should be had to the accompanying drawings forming a part of this specification, in which:

Fig. 1 is a side elevation of apparatus embodying the invention;

Fig. 2 is a fragmentary top plan view of pressure applying rollers viewed as indicated at 2—2 in Fig. 1;

Fig. 3 is a section taken on the line indicated at 3—3 in Fig. 1;

Fig. 10 is a diagrammatic view in vertical section showing the general arrangement of the parts.

Figure 4:
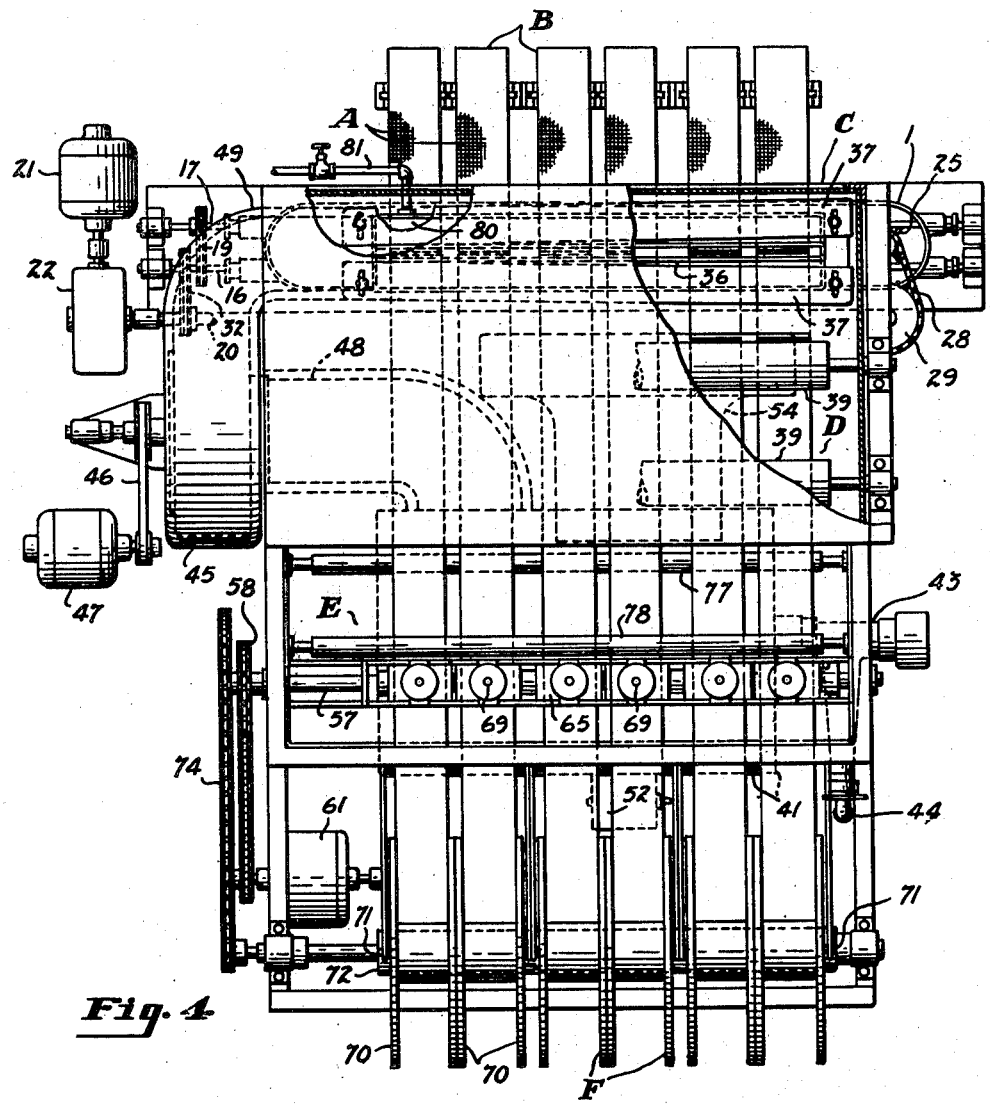
Fig. 4 is a top plan view, with a portion of the drying oven broken away to show parts of the interior thereof.
Figure 5:
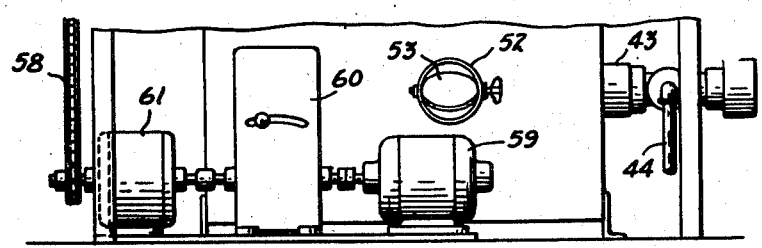
Fig. 5 is a fragmentary rear elevation of the heater and the driving motor for the tape actuating mechanism.

As shown in Figs. 1, 4 and 10 of the drawing, a series of narrow fabric strips A are simultaneously fed from a row of reels B, through a mud bath C, a drying oven D, and dusting receptacle E, to wind-up reels F upon which the completed tapes are wound.

Figure 8:
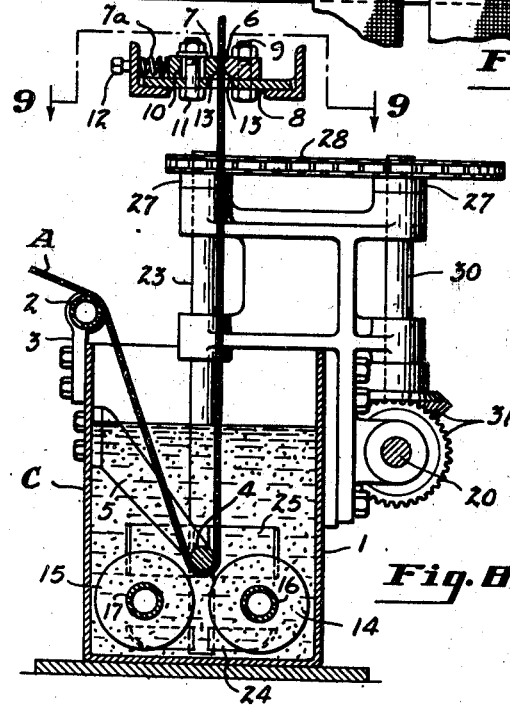
Fig. 8 is a section taken on the line indicated at 8—8 in Fig. 6.
Figure 9:
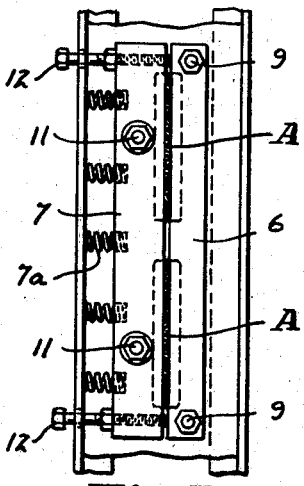
Fig. 9 is a section taken on the line indicated at 9—9 in Fig. 8.

As best shown in Fig. 8 of the drawings, the semi-fluid coating material is applied to the fabric strips A in a dipping tank 1 and the fabric strip A is fed into the tank over an elongated roller 2 at the top front edge of the tank, the roller 2 being supported upon suitable brackets 3 attached to the tank wall. The fabric strips pass downwardly from the roller 2 and under a guide roller 4 in the lower portion of the tank, the roller 4 being supported upon brackets 5 attached to the front wall of the tank. After passing through the tank 1 the strips are guided upwardly between a pair of wiper bars 6 and 7 that are supported upon horizontally disposed plates 8 at opposite sides of the strips. The wiper bar 6 is secured in fixed position upon its plate by means of bolts 9, while the bar 7 is slidably mounted, being guided by means of transverse slots 10 which receive guide bolts 11. The bars 7 are pressed toward the bars 6 by means of springs 7a so that they will yield to permit passage of solid objects between the bars without damage to the fabric and movement of the bars 7 toward the bars 6 is limited by stop screws 12, which may be adjusted to vary the range of movement imparted to bars 7 by the springs. The edges of the bars 6 and 7 presented to the fabric strips A are preferably rounded, as indicated at 13 in Fig. 8.

The composition applied to the fabric strips may consist largely of heavy metallic oxides mixed with sufficient water and appropriate bonder solution such as sodium silicate to produce a mud bath. Such heavy ingredients mixed with water tend to settle rapidly and in order to keep the body of the material through which the tape passes in the tank at a uniform consistency, means is provided for thoroughly agitating the mixture during the coating operation.

Figure 6:
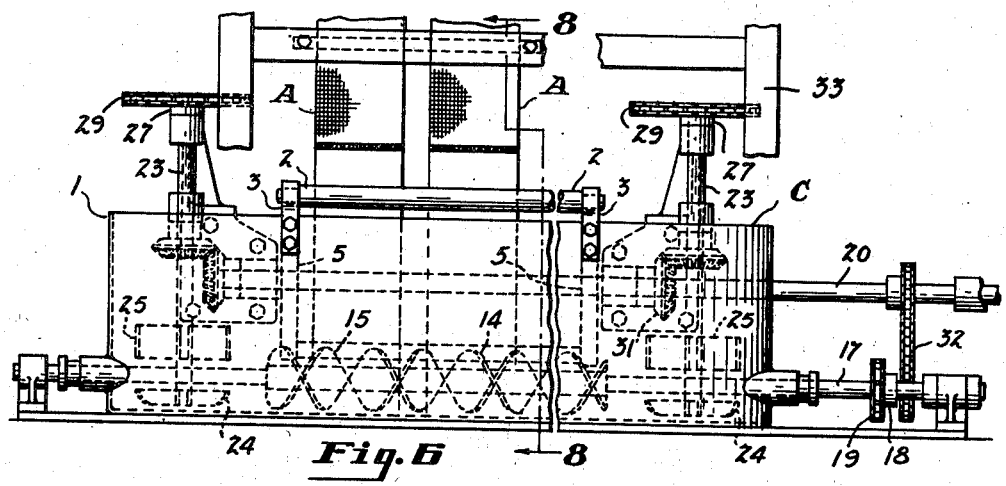
Fig. 6 is a section taken on the line indicated at 6—6 in Fig. 1.
Figure 7:
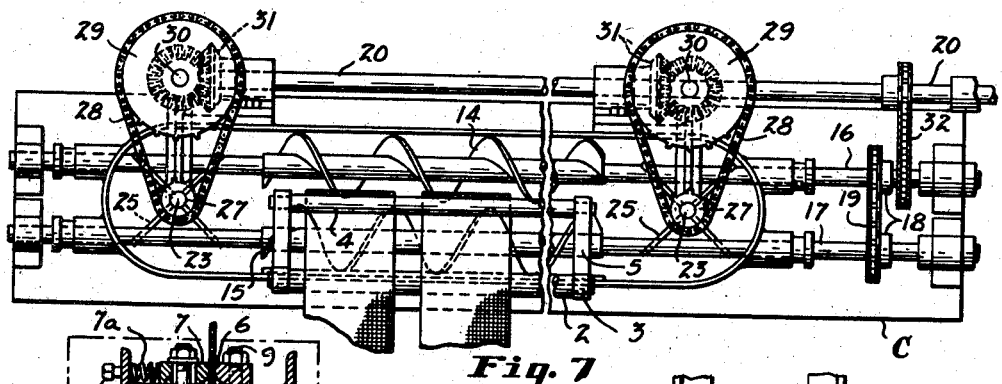
Fig. 7 is a plan view of the dipping tank shown in Fig. 6.

As shown in Figs. 4, 6 and 7, the tank 1 is elongated to permit the dipping simultaneously of several fabric strips. In the tank adjacent to the bottom thereof, two longitudinally extending screws 14 and 15 are mounted side by side. Screws 14 and 15 are mounted upon shafts 16 and 17 which extend beyond the ends of the receptacle and which are provided with sprockets 18 of equal size over which a sprocket chain 19 runs. To enable the screws to have effective stirring action, it is desirable that they be so disposed as to propel the fluid mixture in opposite directions. As herein shown the two screws have blades of opposite angularity and are caused to rotate simultaneously in the same direction by the sprocket chain 19.

Parallel with the shafts 16 and 17 and at the rear of the tank 1 there is mounted a shaft 20 which is driven by an electric motor 21 through suitable gearing in a reduction gear housing 22. Vertical shafts 23 extend down into opposite ends of the tank as shown in Figs. 6 and 7 and have radial vanes 24 attached thereto at their lower ends and a second set of radial vanes 25 attached thereto above the vanes 24. Shafts 23 have sprockets 27 at their upper ends and are driven by sprocket chains 28 that run over the sprockets 27 and over sprockets 29 on vertical shafts 30 that are driven in opposite directions by bevel gears 31 on the shaft 20. The shaft 20 also drives the screws 14 and 15, being connected to the shaft 16 by a sprocket chain 32.

In the operation of the machine the fabric strips A are drawn continuously through the dipping tank 1 and the semi-fluid mixture of the tank is kept at a uniform consistency by means of the agitating screws 14 and 15 and the rotating agitator vanes 24 and 25 at the ends of the tank. By keeping the mud bath at a uniform consistency, a substantially uniform and homogeneous coating is applied to the fabric strips, and this coating is smoothed and compacted by the action of the wiper bars 6 and 7.

The coated strips pass upwardly into the drying oven D which is supported upon a suitable framework 33 with its floor or bottom wall above the wiper bars 6 and 7. The strips pass in a vertical direction through an opening in the bottom wall of the oven which is provided with an entrance chamber 35 which as best shown in Figs. 4 and 10 has vertical walls which form a narrow slot through which the coated strips pass. Above the entrance slot formed by the walls 36, adjustable plates 37 at the top of the entrance chamber 35 are adapted to provide a slot of the desired width through which the tapes enter the main chamber of the drier. The drier is provided with a pair of guide rollers 38 adjacent to the top thereof and with a pair of guide rollers 39 adjacent to the bottom. As shown in Figs. 1 and 10 the fabric is passed over one of the top rollers 38 and beneath the two bottom rollers 39. However, when the nature of the coating applied is such that a longer drying period is desirable, the tape may be directed upwardly from the first of the lower rollers 39 over the second of the upper rollers 38, thence downwardly under the second rollers 39. Adjacent to the bottom thereof the rear wall of the drying oven D is provided with an exit slot 40 through which the tapes may pass.

Beneath the drying oven D there is mounted a heater that is in the form of an elongated cylindrical chamber 41 provided with a refractory lining 42. The heater is provided with a burner 43 at one end which is supplied with fuel through a pipe line 44. Adjacent to the heater there is mounted a fan blower 45 which is driven through a belt 46 by an electric motor 47. A duct 48 connects the inlet of the blower to the heater chamber 41 and a duct 49 connects the outlet of the blower to an opening in the bottom of the drier D. The drying chamber D has an outlet 50 at the top thereof, that is controlled by a damper 51 and the heater chamber 41 has an inlet 52 that is controlled by a damper 53. During operation the blower 45 draws air and combustion gases from the heater chamber 41 and discharges the hot gases through the duct 49 into the drier chamber. Air may pass from the drying chamber D to the heater 41 through a duct 54 connecting the bottom of the drying chamber to the heating chamber 41, so that the heating gases are continuously circulated through the drying chamber. By adjusting the dampers 51 and 53 some of the heating gases may be permitted to escape and additional air may be drawn into the system.

At the rear of the drying chamber there is provided an elongated driving roll 56 over which the tapes pass. The roll 56 is mounted on a horizontal shaft 57 that is driven by a sprocket chain 58 from an electric motor 59 suitable change speed and reducing gears being provided in housings 60 and 61 so that the rate of travel of the tapes may be regulated as desired. As best shown in Fig. 3 the driving roll 56 has a rubber covering 62 to provide more effective frictional engagement with the tape and the individual tapes are pressed against the roll 56 by rollers 63 mounted on short shafts 64 carried by yokes 65 that are slidable vertically in a guide frame 66. The guide frame 66 has side walls 67 that engage opposite sides of the yokes 65 and cross spacers 68 are provided at intervals between yokes 65, the yokes 65 having sliding engagement with the side walls 67 and spacers 68 which retain them in position above the roll 56. Individual adjusting screws 69 are provided for the yokes 65 so that the pressure applied by each roller can be regulated.

The tapes pass from the driving roll 56 to suitable wind-up reels F, each supported on its spindle 71 and supported with their peripheries resting upon a driving roll 72. Reels F are held in position on the driving roll 72 by means of arms 73 that are pivoted at one end to the frame 33 and which hook over the spindles 71. The roll 72 is driven by sprocket chain 74 that passes over a large sprocket 75 on the shaft 57. The driving roll 56 extends across the top of a dusting receptacle 76 that is adapted to contain a suitable powder such as talcum powder. In its passage from the slot 40 to the driving roll 56 the tape is guided over a roller 77 and under a roller 78 that is located adjacent to the bottom of receptacle 76 and directly below the roller 56, the receptacle 76 being partially filled with powder which is held by gravity against the side of the tape that contacts with the roller 62. Any moisture on the tape is thus taken up by powder adhering thereto so that when subsequently wound upon reel F the contacting layers of tape will not adhere together.

It is desirable that the humidity of the oven D be so controlled as to prevent the formation of a hard crust on the surface of the tape before the interior is properly dried. Means is therefore provided for supplying moisture to the air entering the oven adjacent the point of entry of the tape into the oven. As shown in Figs. 4 and 10, a tray 80 is formed in the bottom of the entrance chamber 35 to which hot water is supplied by means of a pipe 81. Water vaporized by the incoming air serves to increase the humidity and prevent too rapid drying of the surface of the tape.

It will be apparent that various changes in the structure herein shown and described may be made without departing from the spirit of the invention.

What we claim is:

1. Apparatus for forming welding tape comprising a dipping receptacle, a pair of parallel oppositely acting screws within the receptacle adjacent the bottom, agitators within the tank adjacent the bottom thereof beyond opposite ends of said screws, means for driving said screws and agitators, and fabric guiding means comprising a roller parallel with said screws and between the same adjacent the peripheries of the screws.

2. Apparatus for forming welding tape comprising a dipping receptable, a pair of parallel oppositely acting screws within the receptable adjacent the bottom, means for driving said screws, fabric guiding means comprising a roller parallel with said screws and centrally disposed with respect thereto adjacent the screw peripheries, agitators within the tank adjacent the bottom thereof, beyond the opposite ends of said screws and roller, said agitators being rotatable about vertical axes, and means for driving said agitators.

3. Apparatus for forming welding tape comprising an elongated dipping receptacle, vertical shafts extending into said receptacle adjacent the ends thereof, parallel horizontal shafts extending longitudinally of the receptacle adjacent the bottom thereof, agitator vanes attached to the vertical shafts adjacent the bottom of the receptacle, screw blades of opposite angularity attached to said horizontal shafts, means for driving said vertical shafts in opposite directions, means for driving the horizontal shafts in the same direction, and a fabric guiding roller mounted between the vertical shafts and parallel with and between said horizontal shafts.

4. Apparatus for forming welding tape comprising a vertically elongated drying oven, a dipping tank beneath said oven, means for guiding a strip of fabric into said tank, guide rollers for the fabric strip within the oven adjacent the top and bottom thereof, a guide roller for the fabric strip in the dipping tank, an entry opening in the bottom of the oven through which the strip passes from the roller in said tank, a lateral exit opening in the rear wall of the oven adjacent the bottom thereof through which the strip passes from the lower roller in said oven, a powder receptacle into which the exit opening leads, a guide roller in said receptacle to which the strip passes from said lower roller, a driving roll above the last mentioned roller, a pressure roller for pressing the tape against said roll, a tape wind-up reel to which the strip passes from the driving roll and means for driving said roll and wind-up reel.

5. Apparatus for forming welding tape comprising a vertically elongated drying oven, a dipping tank beneath said oven, guide rollers within the oven adjacent the top and bottom thereof, a guide roller in the dipping tank, an entry opening in the bottom of the oven, a lateral exit opening in the rear wall of the oven adjacent the bottom thereof, a powder receptacle into which the exit opening leads, means including a power driven roll to the rear of the oven for drawing the strip over said guide rollers and through the tank and oven, a heater beneath the oven, said heater having a burner and a chamber into which combustion gases pass, a duct connecting said chamber to the bottom of the oven, a fan blower, a duct connecting the blower inlet to said chamber, a duct connecting the blower outlet to the bottom of the oven, a damper controlled outlet to the atmosphere at the top of the oven, and a damper controlled inlet for admitting air to said chamber.

6. Apparatus for forming tape comprising a drying oven, a dipping tank beneath said oven, guide rollers within said oven adjacent the top and bottom thereof, a guide roller in said dipping tank, a humidifying entrance chamber in the bottom of said oven and above said dipping tank, a water tray in said entrance chamber, means for supplying water to said tray, means including a power driven roll adjacent an opening in said oven for drawing said tape over said guide rollers and through said tank and said oven, a blower having an inlet and an outlet, a heater located beneath said oven, a duct connecting said heater to said oven, a duct connecting said heater to said blower inlet, a duct connecting said blower outlet to said oven, means for driving said blower to circulate air through said heater and said oven, a damper controlled outlet from said oven to the atmosphere, and a damper controlled inlet for admitting air to said heater.

7. Apparatus for forming tape comprising a drying oven, a dipping tank beneath said oven, guide rollers within said oven adjacent the top and bottom thereof, a guide roller in said dipping tank, a humidifying entrance chamber in the bottom of said oven and above said dipping tank, a water tray in said entrance chamber, means for supplying water to said tray, wiper bars resiliently biased toward one another and located on opposite sides of said tape between said dipping tank and said entrance chamber, means including a power driven roll adjacent an opening in said oven for drawing said tape over said guide rollers and through said tank and said oven, a blower having an inlet and an outlet, a heater located beneath said oven, a duct connecting said heater to said oven, a duct connecting said heater to said blower inlet, a duct connecting said blower outlet to said oven, means for driving said blower to circulate air through said heater and said oven, a damper controlled outlet from said oven to the atmosphere, and a damper controlled inlet for admitting air to said heater.

8. Apparatus for forming tape comprising means for supporting a series of reels each having a narrow strip of fabric wound thereon, a drying oven having in its bottom an entry opening for said strips of fabric, a dipping tank beneath said entry opening in said oven, guide rollers within said oven adjacent the top and bottom thereof, a guide roller in said dipping tank, a heater located beneath said oven and to one side of said dipping tank, a blower having an inlet and an outlet, a duct connecting said heater to the bottom of said oven, a duct connecting said heater to said blower inlet, a duct connecting said blower outlet to the bottom of said oven, means for driving said blower to circulate air through said heater and said oven, means including an elongated power driven roll having a resilient rubber covering over which said strips pass side by side for simultaneously drawing said strips in side by side relationship over said guide rollers and through said tank and said oven, independently adjustable rollers extending lengthwise of said elongated power driven roll for adjustably pressing each of said fabric strips against said roll, a wind-up reel for each strip and means for driving said wind-up reels.

FLOYD C. KNIGHT.
JOHN R. PIERCE.

REFERENCES CITED

The following references are of record in the file of this patent:

UNITED STATES PATENTS

| Number | Name | Date |
|---|---|---|
| 215,321 | Cavin | May 31, 1879 |
| 305,824 | Kites et al. | Sept. 30, 1884 |
| 510,543 | McLennan | Dec. 12, 1893 |
| 752,592 | Rupley | Feb. 16, 1904 |
| 806,270 | Lubbertsmeier | Dec. 5, 1905 |
| 819,800 | Richards | May 8, 1906 |
| 1,045,915 | Turner | Dec. 3, 1912 |
| 1,228,225 | Lynch | May 29, 1917 |
| 1,309,858 | Jones | July 15, 1919 |
| 1,485,254 | Dickie | Feb. 26, 1924 |
| 1,989,800 | Gustin | Feb. 5, 1935 |
| 1,991,171 | Newton | Feb. 12, 1935 |
| 2,011,697 | Vogt | Aug. 20, 1935 |
| 2,065,636 | Whipple et al. | Dec. 29, 1936 |
| 2,115,079 | Lilley et al. | Apr. 26, 1938 |
| 2,115,752 | Stumpp | May 3, 1938 |
| 2,283,014 | Reid | May 12, 1942 |
| 2,370,298 | Engler | Feb. 27, 1945 |
| 2,390,001 | Schindler | Nov. 27, 1945 |